US012520255B2

(12) United States Patent
He

(10) Patent No.: US 12,520,255 B2
(45) Date of Patent: Jan. 6, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/409,463

(22) Filed: Aug. 23, 2021

(65) Prior Publication Data
US 2021/0385774 A1    Dec. 9, 2021

Related U.S. Application Data

(63) Continuation of application No. PCT/CN2019/076773, filed on Mar. 1, 2019.

(51) Int. Cl.
*H04W 56/00* (2009.01)
*H04L 5/00* (2006.01)
*H04L 27/26* (2006.01)

(52) U.S. Cl.
CPC ....... *H04W 56/0015* (2013.01); *H04L 5/0051* (2013.01); *H04L 27/26025* (2021.01)

(58) Field of Classification Search
CPC ............. H04W 56/0015; H04W 56/00; H04W 56/001; H04W 56/0045; H04W 68/005;
(Continued)

(56) References Cited

U.S. PATENT DOCUMENTS

2018/0205585 A1* 7/2018 Sadiq ................. H04L 27/2613
2018/0219596 A1    8/2018 He et al.
(Continued)

FOREIGN PATENT DOCUMENTS

CN         109392144 A    2/2019
JP        2018524842 A    8/2018
(Continued)

OTHER PUBLICATIONS

3GPP TSG RAN WG1 #96 - R1-1901923—Athens, Greece, Feb. 25, 2019-Mar. 1, 2019—OPPO, Enhancements to initial access procedure for NR-U (7 pages).
(Continued)

*Primary Examiner* — Un C Cho
*Assistant Examiner* — Rasha K Fayed
(74) *Attorney, Agent, or Firm* — PERKINS COIE LLP

(57) ABSTRACT

A wireless communication method, a terminal device and a network device are disclosed. The method includes: a terminal device receives a first SSB on an unlicensed spectrum; according to a first bit field and/or a second bit field in PBCH of the first SSB, determines an extended SSB index of the first SSB and/or a first parameter N for determining the QCL relationship, N is a positive integer, the bit position of the first bit field in PBCH is the same as that of a subcarrier interval bit field in PBCH on a licensed spectrum, and the bit position of the second bit field in PBCH is partially or completely the same as that of a subcarrier offset bit field in PBCH on the licensed spectrum; and determines the QCL relationship of the first SSB and other SSBs according to the extended SSB index of the first SSB and N.

14 Claims, 5 Drawing Sheets

(58) Field of Classification Search
CPC ........... H04W 72/005; H04W 72/0446; H04W 72/042; H04W 72/0453; H04W 72/046; H04W 88/02; H04W 48/12; H04W 48/10; H04W 52/0219; H04W 24/08; H04W 24/10; H04W 24/04; H04W 36/0083; H04W 36/0085; H04W 16/28; H04W 76/19; H04W 76/27; H04W 76/28; H04L 27/26025; H04L 27/0006; H04L 27/2613; H04L 27/2611; H04L 27/26; H04L 5/0051; H04L 5/0053; H04L 5/0048; H04L 5/0094; H04L 5/003; H04L 5/0023; H04L 5/14; H04L 5/005; H04L 5/00; H04L 5/0007; H04L 67/12; H04J 3/06; H04B 7/0695; H04B 7/0408; H04B 7/088; H04B 7/0641; H04B 7/0626

See application file for complete search history.

(56) References Cited

U.S. PATENT DOCUMENTS

| | | | |
|---|---|---|---|
| 2018/0279145 A1* | 9/2018 | Jung | H04W 24/08 |
| 2018/0359149 A1* | 12/2018 | Shaheen | H04W 72/0453 |
| 2019/0020517 A1* | 1/2019 | Abedini | H04W 72/005 |
| 2019/0074886 A1* | 3/2019 | Yoon | H04B 7/0617 |
| 2019/0082431 A1* | 3/2019 | Yi | H04L 5/0057 |
| 2019/0103928 A1* | 4/2019 | Nagaraja | H04B 17/309 |
| 2019/0253949 A1* | 8/2019 | Park | H04B 7/0695 |
| 2019/0261425 A1* | 8/2019 | Park | H04L 5/0098 |
| 2019/0274169 A1* | 9/2019 | Tsai | H04W 56/0045 |
| 2019/0281587 A1* | 9/2019 | Zhang | H04L 5/0053 |
| 2019/0313411 A1* | 10/2019 | Ly | H04W 72/0453 |
| 2019/0313440 A1* | 10/2019 | John Wilson | H04J 11/0079 |
| 2020/0053670 A1* | 2/2020 | Jung | H04W 56/0015 |
| 2020/0107277 A1* | 4/2020 | Jeon | H04W 52/36 |
| 2020/0120521 A1* | 4/2020 | da Silva | H04L 5/0048 |
| 2020/0154489 A1* | 5/2020 | Zhou | H04W 56/001 |
| 2020/0178280 A1* | 6/2020 | Guan | H04B 7/0626 |
| 2020/0178309 A1* | 6/2020 | Tie | H04B 7/088 |
| 2020/0229008 A1* | 7/2020 | Islam | H04B 17/309 |
| 2020/0229093 A1* | 7/2020 | Ahmad | H04W 52/0209 |
| 2020/0236638 A1* | 7/2020 | Song | H04L 5/00 |
| 2020/0280957 A1* | 9/2020 | Gao | H04W 76/28 |
| 2020/0281018 A1* | 9/2020 | Li | H04W 8/005 |
| 2020/0322932 A1* | 10/2020 | Kim | H04W 72/042 |
| 2020/0374896 A1* | 11/2020 | Bae | H04L 5/0053 |
| 2020/0404537 A1* | 12/2020 | Harada | H04W 28/06 |
| 2020/0413356 A1* | 12/2020 | Wang | H04W 56/0015 |
| 2021/0007072 A1* | 1/2021 | Wu | H04W 56/006 |
| 2021/0058931 A1* | 2/2021 | Da | H04L 5/0007 |
| 2021/0068085 A1* | 3/2021 | Chen | H04W 72/0453 |
| 2021/0168574 A1* | 6/2021 | Zhang | H04W 8/005 |
| 2021/0176687 A1* | 6/2021 | Ko | H04W 24/08 |
| 2021/0274562 A1* | 9/2021 | Takeda | H04W 74/002 |
| 2021/0297886 A1* | 9/2021 | Chen | H04L 5/0048 |
| 2021/0367820 A1* | 11/2021 | Cha | H04L 27/2621 |
| 2021/0377890 A1* | 12/2021 | Shen | H04L 5/005 |
| 2021/0391899 A1* | 12/2021 | Cao | H04B 17/373 |
| 2022/0015146 A1* | 1/2022 | Rune | H04W 74/0816 |
| 2022/0094487 A1* | 3/2022 | Mondal | H04W 72/044 |
| 2022/0248450 A1* | 8/2022 | Kim | H04L 5/005 |

FOREIGN PATENT DOCUMENTS

| | | |
|---|---|---|
| RU | 2634714 C2 | 11/2017 |
| TW | 201907680 A | 2/2019 |
| WO | 2016067691 A1 | 5/2016 |
| WO | 2017195463 A1 | 11/2017 |
| WO | 2018171924 A1 | 9/2018 |
| WO | 2018195777 A1 | 11/2018 |

OTHER PUBLICATIONS

3GPP TSG RAN WG1 Meeting #96—R1-1902986—Athens, Greece—Feb. 25-Mar. 1, 2019—Qualcomm Incorporated, Initial access and mobility procedures for NR unlicensed (14 pages).
3GPP TSG RAN WG1 Meeting #96—R1-1903322—Athens, Greece, Feb. 25-Mar. 1, 2019—Intel Corporation, Enhancements to initial access and mobility for NR-unlicensed (13 pages).
International Search Report issued Nov. 26, 2019 of PCT/CN2019/076773 (4 pages).
Examination Report for Indian Application No. 202117038490 issued Apr. 12, 2022. 6 pages with English translation.
Extended European Search Report for European Application No. 19918337.7 issued Jan. 27, 2022. 9 pages.
Xiaomi "On SSB transmission in NR unlicensed" R1-1811416; 3GPP TSG RAN WG1 Meeting #94bis; Chengdu, China; Oct. 8-12, 2018. 3 pages.
Charter Communications "Feature lead summary #2 of Enhancements to initial access procedure" 3GPP TSG RAN G1 Meeting #96, R1-1903221; Athens, Greece, Feb. 25-Mar. 1, 2019. 12 pages.
First Office Action of the Japanese application No. 2021-549354, issued on Jul. 8, 2022. 6 pages with English Translation.
First Office Action of the Russian application No. 2021126627, issued on May 6, 2022. 10 pages with English Translation.
First Office Action for Chinese Application No. 202110590386.6 issued Aug. 8, 2022. 20 pages with English translation.
Decision of Refusal for Japanese Application No. 2021-549354 issued Dec. 13, 2022. 7 pages with English translation.
Oppo "Correction on NR-PBCH Definition for TS 28.331" R2-1713951; 3GPP TSG-RAN WG2#100; Reno, USA; Nov. 27-Dec. 1, 2017. 3 pages.
Reconsideration Report by Examiner before Appeal of the Japanese application No. 2021-549354, issued on May 11, 2023. 7 pages.
First Office Action of the Korean application No. 10-2021-7029115, issued on Sep. 1, 2023. 8 pages with English translation.
ZTE, R1-1812433, considerations on DL reference signals and channels design for NR-U, 3GPP TSG RAN WG1 #95, 3GPP server publication date(Nov. 3, 2018), 8 pages.
Office Action for Japanese Application No. 2023-065645 Issued Mar. 5, 2024, 8 Pages.
Nokia, Nokia Shanghai Bell, Remaining details on NR-PBCH, 3GPP TSG-RAN WG1 meeting 90bis, R1-1718612, Prague, Czech Republic Oct. 9-13, 2017, 7 Pages.
CATT, Considerations on synchronization mechanism in NR V2X, 3GPP TSG RAN WG1 Meeting #94, R1-1808401, Gothenburg, Sweden, Aug. 19-24, 2018, 5 Pages.
Huawei, HiSilicon, Initial access in NR unlicensed, 3GPP TSG RAN WGi Ad-Hoc Meeting 1901, R1-1900061, Taipei, Jan. 21-25, 2019, 12 Pages.
Spreadtrum Communications, Discussion on initial access and mobility in NR-U, 3GPP TSG RAN WG1 Ad-Hoc Meeting 1901, R1-1900721, Taipei, Jan. 21-25, 2019, 16 Pages.
NTT Docomo, Inc., Enhancements to initial access procedure for NR-U, 3GPP TSG RAN WG1 #96, R1-1902790, Athens, Greece, Feb. 25-Mar. 1, 2019, 11 Pages.
Second Office Action for Japanese Application No. 2023-065645 issued Aug. 6, 2024. 8 pages with English translation.
Qualcomm Incorporated, "Feature lead summery on initial access signals and channels for NR-U", R1-1901427, 3GPP TSG RAN WG1 Meeting AHI901, Taipei, Taiwan, Jan. 21-Jan. 25, 2019. 29 pages.
Office Action dated May 28, 2025 for Chinese Patent Application No. 202310251072.2 and English Translation, 16 pages.

* cited by examiner

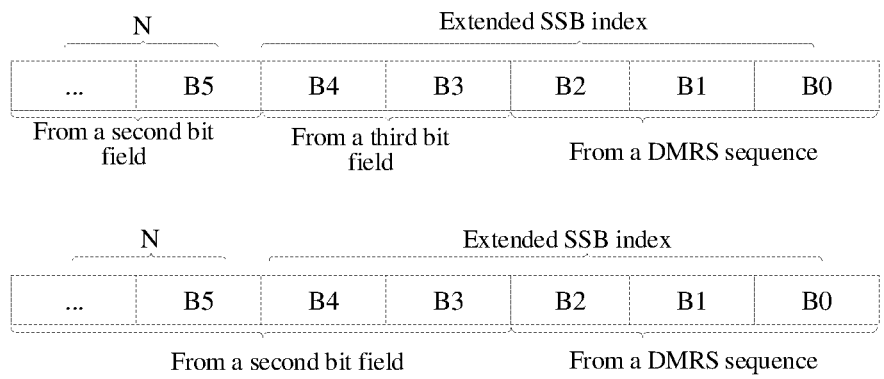

FIG. 7

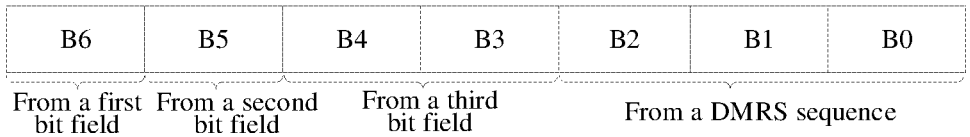

A network device sends a first Synchronization Signal Block (SSB) to a terminal device in an unlicensed spectrum, wherein according to subcarrier offset information of a first bit field and/or a second bit field in a physical broadcast channel (PBCH) of the first SSB, an extended SSB index of the first SSB and/or a first parameter N for determining a quasi-co-located (QCL) relationship are determined, wherein N is a positive integer, a bit position of the first bit field in the PBCH is the same as a bit position of a subcarrier spacing bit field in a PBCH in a licensed spectrum, and a bit position of the second bit field in the PBCH is partially or completely the same as a bit position of a subcarrier offset bit field in the PBCH in the licensed spectrum, and the extended SSB index of the first SSB and N are used for the terminal device to determine the QCL relationship of the first SSB and other SSBs, wherein N is a positive integer ⟵ S310

FIG. 9

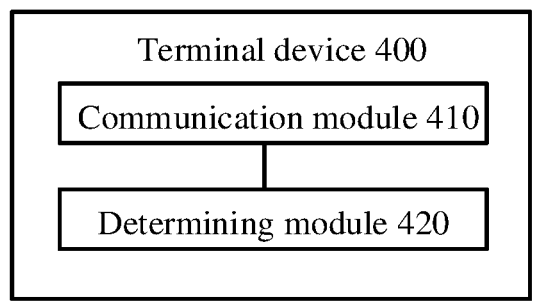

FIG. 10

WIRELESS COMMUNICATION METHOD, TERMINAL DEVICE AND NETWORK DEVICE

CROSS-REFERENCE TO RELATED APPLICATION

The present application is a continuation application of International PCT Application No. PCT/CN2019/076773, filed on Mar. 1, 2019, the entire content of which is hereby incorporated by reference.

TECHNICAL FIELD

Implementations of the present disclosure relate to the field of communications, and particularly to a wireless communication method, a terminal device, and a network device.

BACKGROUND

In a 5-Generation New Radio (5G NR) system, an index of a Synchronization Signal (SSB) can be sent periodically. In one SSB period, a transmission position of an SSB is determinate, and a terminal device may determine the transmission position of the SSB according to the received SSB index.

On an unlicensed spectrum, a communication device follows a principle of "Listen Before Talk (LBT)", that is, before sending signals on a channel of an unlicensed spectrum, the communication device needs to conduct channel listening first, and the communication device can send signals only when the result of channel listening is that the channel is idle. If the channel listening result of the communication device on a channel of an unlicensed spectrum is that the channel is busy, the communication device cannot send signals.

When the 5G NR system is applied to an unlicensed spectrum, a network device must successfully perform LBT and obtain the right to use a channel before sending SSBs. That is to say, in an unlicensed frequency band, the actual starting position of sending SSBs is uncertain. After receiving the SSBs, a terminal device cannot know a Quasi-co-located (QCL) relationship between the SSBs, and therefore cannot perform combining and filtering for SSBs having QCL relationship, thus affecting the system performance. Therefore, how to determine the QCL relationship between SSBs is a problem worth studying.

SUMMARY

Implementations of the present disclosure provide a wireless communication method, a terminal device and a network device, capable of determining the QCL relationship of SSBs.

In a first aspect, there is provided a wireless communication method, including: receiving, by a terminal device, a first Synchronization Signal Block (SSB) in an unlicensed spectrum; determining, according to a first bit field and/or a second bit field in a Physical Broadcast Channel (PBCH) of the first SSB, an extended SSB index of the first SSB and/or a first parameter N for determining a Quasi-co-located (QCL) relationship, wherein N is a positive integer, a bit position of the first bit field in the PBCH is the same as a bit position of a subcarrier spacing bit field in a PBCH on a licensed spectrum, and a bit position of the second bit field in the PBCH is partially or completely the same as a bit position of a subcarrier offset bit field in the PBCH in the licensed spectrum; and determining the QCL relationship of the first SSB and other SSBs according to the extended SSB index of the first SSB and N.

In a second aspect, there is provided a wireless communication method, including: sending, by a network device, a first Synchronization Signal Block (SSB) to a terminal device in an unlicensed spectrum, wherein according to a first bit field and/or a second bit field in a Physical Broadcast Channel (PBCH) of the first SSB, an extended SSB index of the first SSB and/or a first parameter N for determining a Quasi-co-located (QCL) relationship are determined, wherein N is a positive integer, a bit position of the first bit field in the PBCH is the same as a bit position of a subcarrier spacing bit field in a PBCH in a licensed spectrum, and a bit position of the second bit field in the PBCH is partially or completely the same as a bit position of a subcarrier offset bit field in the PBCH in the licensed spectrum, and the extended SSB index of the first SSB and N are used for the terminal device to determine the QCL relationship of the first SSB and other SSBs, wherein N is a positive integer.

In a third aspect, there is provided a wireless communication method, including:

determining, by a terminal device, a first parameter N for determining a Quasi-co-located (QCL) relationship, according to a Demodulation Reference Signal (DMRS) sequence of a physical broadcast channel (PBCH) in a received first Synchronization Signal Block (SSB) in combination with a second correspondence relationship, wherein the second correspondence relationship is a correspondence relationship between multiple DMRS sequences and multiple values of the first parameter.

In some possible implementations, the second correspondence relationship is a correspondence relationship between multiple DMRS sequences and multiple combinations of the first parameter and partial bits in the extended SSB index.

In some possible implementations, N is the quantity of SSBs actually sent by the network device.

In a fourth aspect, there is provided a wireless communication method, including:

sending, by a network device, a second correspondence relationship to a terminal device, the second correspondence relationship being used for the terminal device to determine a first parameter N for determining a Quasi-co-located (QCL) relationship, wherein the second correspondence relationship is a correspondence relationship between multiple DMRS sequences and multiple values of the first parameter.

In some possible implementations, the second correspondence relationship is a correspondence relationship between multiple DMRS sequences and multiple combinations of the first parameter and partial bits in the extended SSB index.

In some possible implementations, N is the quantity of SSBs actually sent by the network device.

In a fifth aspect, there is provided a terminal device, which is used for performing the method in the first aspect or in any possible implementation of the first aspect, or for performing the method in the third aspect or in any possible implementation of the third aspect. Specifically, the terminal device includes units for performing the method in the first aspect or in any possible implementation of the first aspect, or includes units for performing the method in the third aspect or in any possible implementation of the third aspect.

In a sixth aspect, there is provided a network device, which is used for performing the method in the second aspect or in any possible implementation of the second aspect, or for performing the method in the fourth aspect or in any possible implementation of the fourth aspect. Specifically, the network device includes units for performing the method in the second aspect or in any possible implementation of the second aspect, or includes units for performing the method in the fourth aspect or in any possible implementation of the fourth aspect.

In a seventh aspect, there is provided a terminal device, including a processor and a memory. The memory is used for storing a computer program, and the processor is used for calling and running the computer program stored in the memory to perform the method in the first aspect or in each implementation thereof, or perform the method in the third aspect or in any possible implementation of the third aspect.

In an eighth aspect, there is provided a network device, including a processor and a memory. The memory is used for storing a computer program, and the processor is used for calling and running the computer program stored in the memory to perform the method in the second aspect or in each implementation thereof, or perform the method in the fourth aspect or in any possible implementation of the fourth aspect.

In a ninth aspect, there is provided a chip for implementing the method in any one of the first to fourth aspects or in each implementation thereof.

Specifically, the chip includes a processor for calling and running a computer program from a memory, to enable a device on which the chip is installed to perform the method in any one of the first to fourth aspects or in each implementation thereof.

In a tenth aspect, there is provided a computer-readable storage medium for storing a computer program that enables a computer to perform the method in any one of the first to fourth aspects or in each implementation thereof.

In an eleventh aspect, there is provided a computer program product including computer program instructions that enable a computer to perform the method in any one of the first to fourth aspects or in each implementation thereof.

In a twelfth aspect, there is provided a computer program which, when running on a computer, enables the computer to perform the method in any one of the first to fourth aspects or in each implementation thereof.

According to the above technical solutions, after receiving an SSB, a terminal device can determine, according to a first bit field and/or a second bit field in a Physical Broadcast Channel (PBCH) of the first SSB, an extended SSB index of the first SSB and/or a first parameter N for determining a Quasi-co-located (QCL) relationship, and can further determine the QCL relationship of the first SSB and other SSBs according to the extended SSB index of the first SSB and N.

BRIEF DESCRIPTION OF DRAWINGS

FIG. 7 is a schematic diagram of another indication mode of an extended SSB index and N.

FIG. 8 is a schematic diagram of a further indication mode of an extended SSB index and N.

FIG. 9 is a schematic diagram of another wireless communication method according to an implementation of the present disclosure.

FIG. 10 is a schematic block diagram of a terminal device according to an implementation of the present disclosure.

DETAILED DESCRIPTION

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skills in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next-generation communication system or other communication systems, etc.

Generally speaking, a traditional communication system supports a limited quantity of connections, which is also easy to implement. However, with the development of communication technology, a mobile communication system will not only support traditional communication, but also support, for example, Device to Device (D2D) communication, Machine to Machine (M2M) communication, Machine Type Communication (MTC), Vehicle to Vehicle (V2V) communication, etc. The implementations of the present disclosure can also be applied to these communication systems.

Figure 1:
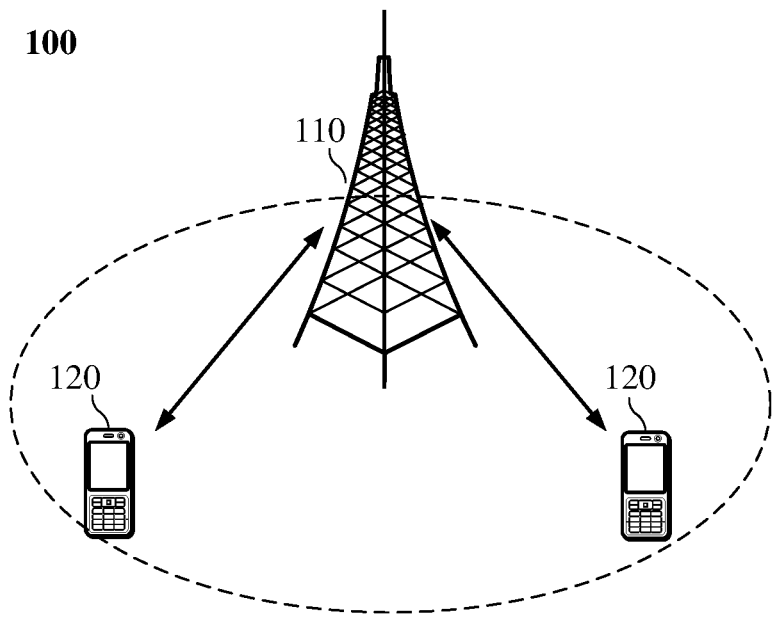
FIG. 1 is a schematic diagram of an application scenario according to an implementation of the present disclosure.

Illustratively, a communication system 100 applied in an implementation of the present disclosure is as shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, a device configured to receive/send a communication signal via a wired line, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, and an AM-FM broadcast transmitter; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communications System (PCS) terminal that can be combined a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or other electronic apparatuses including a radio telephone transceiver. The terminal device may be referred to as an access terminal, User Equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, a terminal device in a future evolved PLMN, or the like.

Optionally, terminal direct connection (Device to Device, D2D) communication may be performed between the terminal devices 120.

Optionally, a 5G system or a 5G network can also be called a New Radio (NR) system or a NR network.

FIG. 1 shows one network device and two terminal devices as an example. Optionally, the communication system 100 may include multiple network devices, and other quantities of terminal devices may be included within the coverage area of each network device, and this is not restricted in the implementations of the present disclosure.

Optionally, the communication system 100 may further include other network entities such as a network controller and a mobile management entity, which is not restricted in the implementations of the present disclosure.

It should be understood that devices with communication function in a network/system may be referred to as communication devices in the implementations of the present disclosure. Taking the communication system 100 shown in FIG. 1 as an example, communication devices may include a network device 110 and a terminal device 120 which have communication function, and the network device 110 and the terminal device 120 may be the specific devices described above, which will not be described here again. The communication devices may also include other devices in the communication system 100, e.g., other network entities such as a network controller and a mobile management entity, which is not restricted in the implementations of the present disclosure.

It should be understood that the terms "system" and "network" are often used interchangeably here. The term "and/or" herein is merely an association relationship describing associated objects, indicating that there may be three relationships, for example, A and/or B may indicate three cases: A alone, A and B, and B alone. In addition, the symbol "/" herein generally indicates that associated objects before and after the symbol "/" have an "or" relationship.

In a NR system, an SSB may be sent within a certain time window (e.g., a time window of 5 ms), and may be sent repeatedly at a certain period. Optionally, the period may be, for example, 5 ms, 10 ms, 20 ms, 40 ms, 80 ms, 160 ms, etc. Within one time window, the largest quantity of SSBs that can be sent by a network device is L, and the quantity of SSBs actually sent may be smaller than L.

For a terminal device, an SSB index may be obtained through a received SSB. The SSB index corresponds to a relative position of the SSB in the time window. The terminal device determines, according to the SSB index and half-frame indication carried in a Physical Broadcast Channel (PBCH), a position of the SSB in a radio frame, thus obtaining frame synchronization.

With regard to the QCL relationship, the terminal device may assume that SSBs with the same SSB index have the QCL relationship, that is, if the SSBs received by the terminal device at different times have the same indexes, they are considered to have the QCL relationship.

In a NR-U system, since channel resources in an unlicensed spectrum are shared, and when using these shared resources, a communication device needs to sense an idle channel before using the channel, in such a case, it is difficult to ensure sending and receiving an SSB periodically at a fixed position. Because a timing position of LBT success of a sending device is unpredictable, a LBT failure is very likely to enable a failure in sending and receiving an SSB.

Therefore, in a NR-U system, multiple candidate positions of SSB are provided, so that after a LBT success, there are still enough candidate positions of SSB that can be used to send an SSB, and accordingly, the influence of a LBT failure on SSB reception is avoided. Specifically, within one time window, Y SSB candidate positions may be configured, and at most L SSBs can be transmitted at the Y candidate positions of SSB transmission, wherein L is smaller than Y, and SSBs can only be sent after the sending device obtains an available channel.

Figure 2:
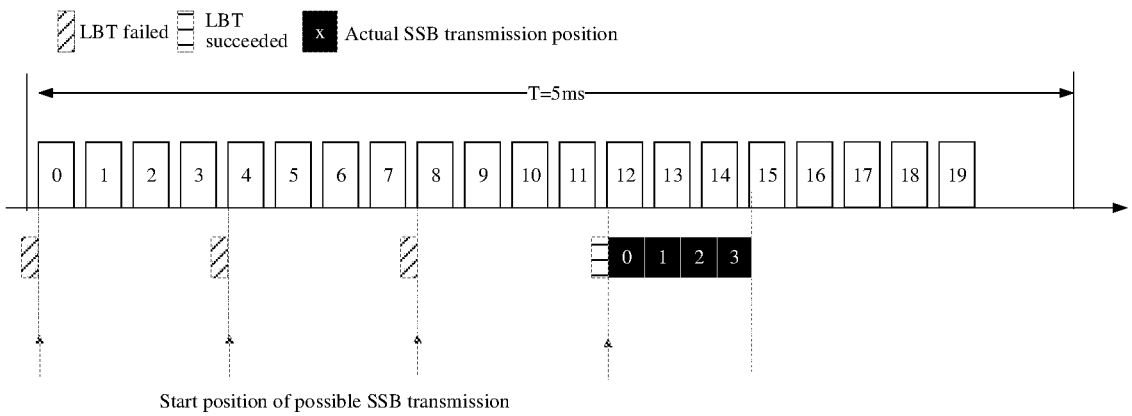
FIG. 2 is a schematic diagram of transmission of an SSB in an unlicensed spectrum.

In an example where the time window is 5 ms, L is 4 and Y is 20, as shown in FIG. 2, if the network device performs LBT successfully before a candidate position 12, it starts to send SSBs with an SSB index of 0-3 at the candidate position 12. Thus, in a NR-U system, the actual transmission position of SSB may start from any one of the Y candidate positions. Therefore, if the terminal device needs to obtain frame synchronization through an SSB received at a candidate position, in an implementation, an extended SSB index may be defined to indicate the Y candidate positions. In this case, the index carried by the SSB is extended to 0 to Y−1, so that the terminal device can determine the actual transmission position of the SSB within the time window according to the extended SSB index carried by the received SSB, thereby obtaining frame synchronization.

That is to say, an extended SSB index carried by an SSB may be understood as a position index of the SSB within the time window, which may also be called an SSB position index, or an extended SSB index carried by an SSB is used for indicating a position index of an actual transmission position of the SSB in the Y candidate positions.

Figure 3:
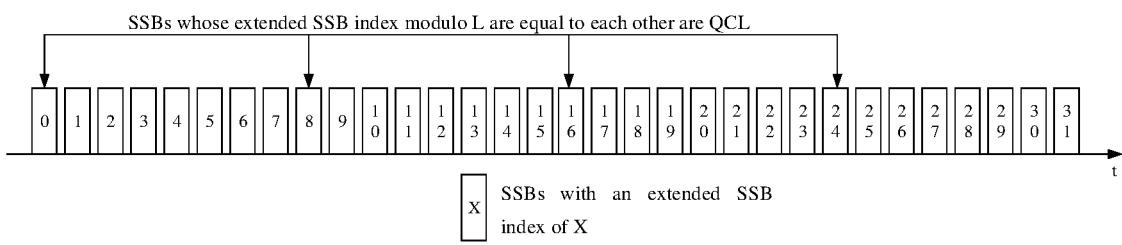
FIG. 3 is a schematic diagram of an SSB candidate position and a QCL relationship.

In order for the terminal device to determine the QCL relationship between SSBs, in an implementation, it may be assumed that SSBs with the same results in extended SSB index modulo L among SSBs within one time window have the QCL relationship. Based on this assumption, SSBs in the same beam can only be sent at specific candidate positions. As shown in FIG. 3, taking L=8 and Y=32 as an example, SSBs with the same results in extended SSB index modulo 8 have QCL relationship, wherein the extended SSB index is 0-31, then it can be determined that SSBs with an extended SSB index of 0, 8, 16 and 24 have QCL relationship.

However, the above solution brings forth a problem that there is a binding relationship between QCL attribute of the SSBs actually sent by the network device and the candidate positions. That is, SSBs meeting the QCL relationship can be sent at only several fixed positions, rather than at any of the candidate positions. As the use of signals in an unlicensed spectrum is based on a LBT mechanism, this restriction will inevitably reduce the utilization efficiency of channels.

Figure 4:
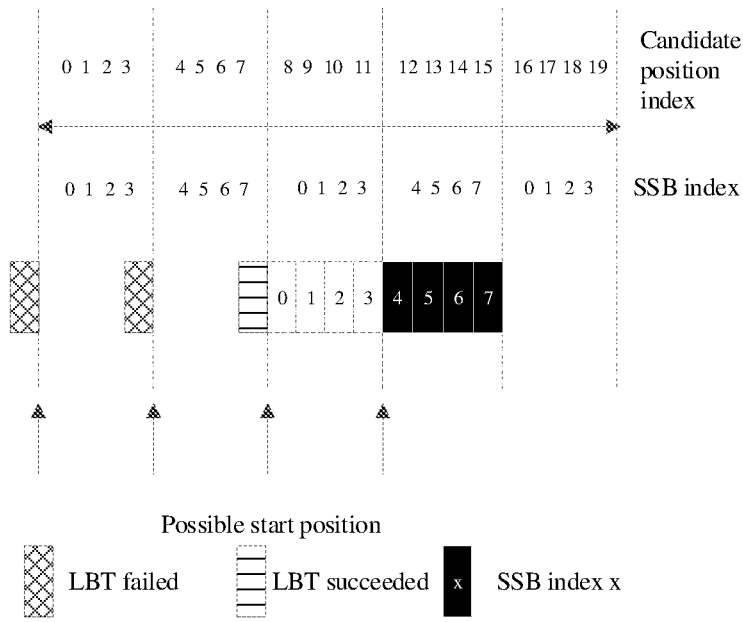
FIG. 4 is a schematic diagram of SSB transmission based on the candidate position and QCL relationship shown in FIG. 3.

With reference to FIG. 4, taking L=8 and Y=20 as an example, if the quantity of SSBs actually sent by the network device is 4, the SSB indexes of the four SSBs are 4, 5, 6 and 7. Based on the above assumption, the SSBs with the SSB index being 4 can only be sent at candidate positions 4 and 12. If the network device performs LBT successfully before candidate position 8, the network device needs to wait until candidate position 12 to start sending the 4 SSBs with the SSB indexes of 4, 5, 6 and 7. As a result, the channels at candidate positions 8-11 cannot be used, thereby causing a waste of resources. Further, in the NR-U system, if the time-frequency resources between the candidate positions 8-11 are not occupied, other devices may perform LBT successfully in the time-frequency resources and occupy the channels, thereby affecting the SSB transmission after the candidate position 12.

In view of this, an implementation of the present disclosure provides a new determining method, which can be used for determining the QCL relationship of SSBs, and is conducive to reducing the waste of resources in an unlicensed spectrum.

Figure 5:
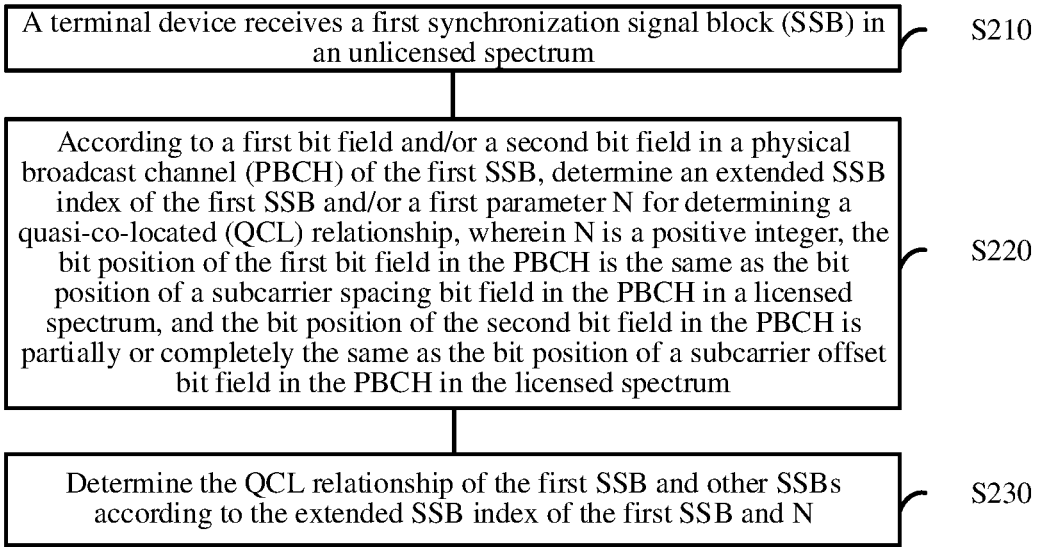
FIG. 5 is a schematic diagram of a wireless communication method according to an implementation of the present disclosure.

FIG. 5 is a schematic flow chart of a wireless communication method according to an implementation of the present disclosure. The method 200 may be performed by a terminal device in a communication system as shown in FIG. 1. As shown in FIG. 5, the method 200 includes at least part of the following contents S210-S230.

In S210, the terminal device receives a first Synchronization Signal Block (SSB) in an unlicensed spectrum.

In S220, an extended SSB index of the first SSB and/or a first parameter N for determining a Quasi-co-located (QCL) relationship are determined according to a first bit field and/or a second bit field in a Physical Broadcast Channel (PBCH) of the first SSB, wherein N is a positive integer, a bit position of the first bit field in the PBCH is the same as a bit position of a subcarrier spacing bit field in a PBCH in a licensed spectrum, and a bit position of the second bit field in the PBCH is partially or completely the same as a bit position of a subcarrier offset bit field in the PBCH in the licensed spectrum.

In S230, the QCL relationship of the first SSB and other SSBs is determined according to the extended SSB index of the first SSB and N.

In an implementation of the present disclosure, in order for the terminal device to determine the QCL relationship between SSBs, the terminal device may obtain a first parameter N, and determine the QCL relationship of the first SSB and other SSBs based on an extended SSB index of the received first SSB and N. In some implementations, the terminal device may assume that SSBs with the same results in extended SSB index modulo N have the QCL relationship therebetween. Further, the terminal device may perform filtering for the SSBs having the QCL relationship as a measurement result of beam level, which is beneficial to improving system performance.

Optionally, in an implementation of the present disclosure, an extended SSB index of an SSB may be understood as a position index of the SSB within a time window for sending the SSB, which may also be called an SSB position index; or an extended SSB index carried by an SSB is used for indicating a position index of an actual transmission position of the SSB in the Y candidate positions.

Optionally, in an implementation of the present disclosure, N may be the quantity of SSBs actually sent by the network device, or may be other parameters for determining the QCL relationship of SSBs, which is not restricted in an implementation of the present disclosure.

Optionally, in an implementation of the present disclosure, the first SSB includes at least one of the following signals:

a Primary Synchronization Signal (PSS), a Secondary Synchronization Signal (SSS) and a Physical Broadcast Channel (PBCH).

Optionally, in an implementation of the present disclosure, the terminal device may determine at least one of the extended SSB index and N according to at least one of a first bit field and a second bit field in the PBCH of the received first SSB, wherein the first bit field in the PBCH may correspond to a subcarrier spacing bit field in the PBCH in the licensed spectrum, and the second bit field in the PBCH may correspond to part or all of bit positions of a subcarrier offset bit field in the PBCH in the licensed spectrum.

For the convenience of understanding and explanation, brief description is made on information carried in the PBCH in a licensed spectrum.

Information carried by a PBCH channel in an unlicensed spectrum includes A-bit information from a higher layer and information related to a physical layer (layer 1), wherein the information related to layer 1 includes System Frame Number (SFN), half-frame indication, SSB index and so on.

Specifically, the information carried by the PBCH channel includes a Master Information Block (MIB) from a higher layer, having A bits in total, i.e., $\bar{a}_0, \bar{a}_1, \bar{a}_2, \bar{a}_3, \ldots, \bar{a}_{\bar{A}-1}$, and 8-bit information from the layer 1, i.e., $\bar{a}_{\bar{A}}, \bar{a}_{\bar{A}+1}, \bar{a}_{\bar{A}+2}, \bar{a}_{\bar{A}+3}, \ldots, \bar{a}_{\bar{A}+7}$. The A-bit MIB includes 6 bits of SFN, 1 bit of subCarrierSpacingCommon information, 4 bits of ssb-SubcarrierOffset information, relevant information of Demodulation Reference Signal (DMRS), resource information of a Physical Downlink Control Channel (PDCCH)

for scheduling a System Information Block (SIB), etc.; and one idle bit is also included therein.

The ssb-SubcarrierOffset bit field includes 4 bits, which is used for indicating an offset $k_{SSB}$ between Physical Resource Block (PRB) grids that between SSB and non-SSB channels or signals. The offset $k_{SSB}$ includes 0-11 subcarriers or 0-23 subcarriers, and the ssb-SubcarrierOffset bit field may correspond to low-order 4 bits of the parameter $k_{SSB}$. SubCarrierSpacingCommon is used for indicating subcarrier spacing of SIB1, message 2/message 4(Msg.2/4) for initial access, paging and broadcast SI-messages.

In the 8-bit information of layer 1, i.e., $\bar{a}_{\bar{A}}$, $\bar{a}_{\bar{A}+1}$, $\bar{a}_{\bar{A}+2}$, $\bar{a}_{\bar{A}+3}$, ..., $\bar{a}_{\bar{A}+7}$, $\bar{a}_{\bar{A}}$, $\bar{a}_{\bar{A}+1}$, $\bar{a}_{\bar{A}+2}$, $\bar{a}_{\bar{A}+3}$ are the lowest-order 4 bits of SFN; and $\bar{a}_{\bar{A}+4}$ is half-frame indication. When $L_{SSB}=64$, $\bar{a}_{\bar{A}+5}$, $\bar{a}_{\bar{A}+6}$, $\bar{a}_{\bar{A}+7}$ are the highest-order 3 bits of SSB index, otherwise, $\bar{a}_{\bar{A}+5}$ is the highest-order bit of the parameter $k_{SSB}$; and $\bar{a}_{\bar{A}+6}$,$\bar{a}_{\bar{A}+7}$ are reserved bits or idle bits. $L_{SSB}$ is the largest quantity of SSBs, herein $L_{SSB}$ corresponds to the aforementioned L, and $k_{SSB}$ is the subcarrier offset information of SSBs. When the system frequency band is less than 6 GHz, i.e., $L_{SSB}$ is smaller than 64, the information related to layer 1 has 2-bit idle bits.

In an implementation of the present disclosure, a PBCH of an SSB received in the unlicensed spectrum may include a first bit field and a second bit field. The first bit field may correspond to a subCarrierSpacingCommon bit field in a PBCH in the licensed spectrum, and the second bit field in the PBCH may correspond to part or all of bit positions of an ssb-SubcarrierOffset bit field in the PBCH in the licensed spectrum.

For example, the first bit field may correspond to one bit of subCarrierSpacingCommon, and the second bit field may correspond to part or all of the four or five bits of the ssb-SubcarrierOffset.

It may be understood that the quantity of bits occupied by each bit field in the PBCH in the licensed spectrum above is only an example, and the quantity of bits occupied by each bit field may alternatively be adjusted according to implementation requirements, provisions in protocols, etc., which is not restricted in an implementation of the present disclosure.

In a communication system based on unlicensed spectrum, such as a NR-U system, the subcarrier spacing of SSB is generally the same as that of a PDCCH for scheduling SIB1. Thus, in the NR-U system, the subcarrier spacing of SIB1, Msg.2/4 for initial access, paging and broadcast system messages may not need to be indicated through subCarrierSpacingCommon, but may be directly considered to be the same as the subcarrier spacing of SSB. Therefore, the first bit field in the PBCH in the unlicensed spectrum corresponding to the subCarrierSpacingCommon may be used for indicating at least partial information of the extended SSB index and N.

In a communication system based on unlicensed spectrum, such as a NR-U system, the PRB grids between SSB and non-SSB channels or signals are aligned, or have a limited offset. In this case, the quantity of bits contained in the bit field for indicating $k_{SSB}$ can be reduced, then the surplus bits may be used for indicating at least partial information of an extended SSB index or N. Specifically, in a NR system, licensed frequency bands may be assigned to different operators, the PRB grids of SSB are predefined, and the operators may flexibly set PRB grids of non-SSBs when using the assigned licensed frequency bands, without being limited by the predefined SSB PRB grids, thereby making use of spectrum resources more flexibly and efficiently. However, in the NR-U system, since it is an unlicensed spectrum, there is no spectrum assignment. In this case, it can be stipulated that the PRB grids between SSB and non-SSB channels or signals are aligned, or an offset thereof has limited values. In this way, the quantity of bits occupied by the bit field of $k_{SSB}$ can be reduced, and further, part or all of bits in the ssb-SubcarrierOffset bit field can be used for indicating at least partial information of the extended SSB index and N.

Taking ssb-SubcarrierOffset as an example, if the PRB grids between SSB and non-SSB channels or signals are aligned, in this case, 5 bits of the ssb-SubcarrierOffset can all be used for indicating at least partial information of extended SSB index or N; or if the PRB grids between SSB and non-SSB channels or signals have a limited offset, 1-4 bits of the ssb-SubcarrierOffset can be used for indicating partial information of the extended SSB index or N, and other parts of the extended SSB index or N may be indicated by other information, e.g., by idle bits or DMRS sequences.

It should be understood that the first bit field in the PBCH in the unlicensed spectrum may also be referred to as subCarrierSpacingCommon bit field in some cases, or may be determined according to the content actually indicated by the first bit field. For example, when the first bit field is used for indicating N, the first bit field may be referred to as N bit field, or when the first bit field is used for indicating part of an extended SSB index, the first bit field may be referred to as an extended SSB index bit field, which is not restricted in an implementation of the present disclosure.

Similarly, the second bit field in the PBCH in the unlicensed spectrum may also be referred to as ssb-SubcarrierOffset bit field in some cases, or may be determined according to the content actually indicated by the second bit field. For example, when the second bit field is used for indicating N, the second bit field may be referred to as N bit field, or when the second bit field is used for indicating at least part of an extended SSB index, the second bit field may be referred to as an extended SSB index bit field, which is not restricted in an implementation of the present disclosure.

Optionally, in an implementation of the present disclosure, the extended SSB index may be carried by the first bit field and/or the second bit field in the PBCH.

For example, if the extended SSB index includes 5 bits of information, in this case, 1 bit of the 5 bits may be carried by the first bit field, at least part of the other 4 bits of the 5 bits may be carried by the second bit field; or 2 bits of the 5 bits may be carried by the second bit field, and the other bits of the 5 bits may be carried by other information such as idle bits or DMRS signaling.

Optionally, in an implementation of the present disclosure, N may be carried by the first bit field and/or the second bit field in the PBCH.

For example, N may be carried by the first bit field. Assuming that a length of the first bit field is 1 bit, the value of N may be determined according to the value of the first bit field. For example, when the value of the first bit field is 0, it may be determined that N=2; and when the value of the first bit field is 1, it may be determined that N=4.

In another example, N may be carried by the second bit field. Assuming that a length of the second bit field is 4 bits, N may be carried according to 2 bits in the second bit field. For example, when the value of the 2 bits is 00, it may be determined that N=2; when the value of the 2 bits is 01, it may be determined that N=4; when the value of the 2 bits is 10, it may be determined that N=6; and when the value of the 2 bits is 11, it may be determined that N=8.

In a further example, if N occupies P bits, P1 bits of the P bits may be carried by the first bit field, and the other bits of the P bits are carried by the second bit field, or by idle bits.

Optionally, in an implementation of the present disclosure, the terminal device may alternatively determine N according to the DMRS sequence of the PBCH. For example, N may be determined according to the DMRS sequence of the PBCH and a second correspondence relationship.

In an implementation, the second correspondence relationship may be a correspondence relationship between multiple DMRS sequences and multiple values of N, so that the terminal device can determine the corresponding N according to the DMRS sequence corresponding to the PBCH of the received first SSB.

In another implementation, the second correspondence relationship may alternatively be a correspondence relationship between multiple DMRS sequences and multiple combinations of values of N and partial bits in the extended SSB index.

For example, in the second correspondence relationship, the first DMRS sequence indicates that the binary low-order two bits of the extended SSB index are 10 and N is 2, and the second DMRS sequence indicates that the binary low-order two bits of the extended SSB index are 11 and N is 4, so that the terminal device can determine partial bits of the corresponding extended SSB index and N according to the DMRS sequences corresponding to PBCH of the received first SSB. That is to say, N and partial bits in the extendable SSB index can be jointly encoded and correspond to the DMRS sequences.

Optionally, in other implementations, N may be preconfigured or configured by a network device.

Optionally, in some implementations, S220 may specifically include:

determining an extended SSB index of the first SSB and/or N according to a first bit field and/or a second bit field in the PBCH of the first SSB, in combination with a Demodulation Reference Signal (DMRS) sequence of the PBCH and/or a third bit field in the PBCH, wherein a bit position of the third bit field in the PBCH is partially or completely the same as a bit position of an idle bit field in a PBCH in a licensed spectrum.

That is, part or all of the information of the extended SSB index of the first SSB may be carried by at least one of the first bit field and the second bit field, and at least one of the DMRS sequence and the third bit field. And part or all of the information of N may be carried by at least one of the first bit field and the second bit field, and at least one of the DMRS sequence and the third bit field.

Next, the carrying mode of the extended SSB index and N will be specifically described in connection with specific implementations, i.e., Implementations 1 to 3.

In the following implementations, it is assumed that the extended SSB index occupies K bits, N occupies P bits, the first bit field has Q bits, and the second bit field has M bits, wherein K, P, Q and M are positive integers.

In Implementation 1, at least partial information of the extended SSB index and N is carried by the first bit field.

In some implementations, the DMRS sequence may be used for determining partial bits of the extended SSB index. Specifically, the DMRS sequence determines $K_1$ bits in the extended SSB index, wherein $K_1<K$, wherein the $K_1$ bits are the low-order $K_1$ bits or the high-order $K_1$ bits among the K bits of the extended SSB index. Specifically, the DMRS sequence and the $K_1$ bits of the extended SSB index may have a first correspondence relationship, and different DMRS sequences indicate different values of the $K_1$ bits.

At least one of the other $K-K_1$ bits in the K bits may be carried by the third bit field, or may also be carried by the first bit field.

N may be carried in the first bit field, or may be carried in the third bit field, or may be carried jointly by the first bit field and the third bit field.

Figure 6:
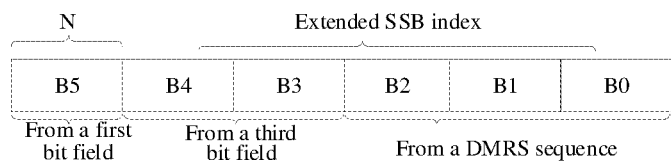
FIG. 6 is a schematic diagram of an indication mode of an extended SSB index and N.

In a specific example, K=5, $K_1$=3, the $K_1$ bits are the low-order 3 bits of the K bits, and the first bit field has 1 bit, that is, Q=1. As shown in FIG. 6, the DMRS sequence may be used for determining the low-order 3 bits (B0-B2) of the 5 bits of the extended SSB index, and the third bit field may be used for carrying the high-order 2 bits (B3-B4) of the extended SSB index, and the first bit field may be used to indicate N, for example, it may be determined that N=2 when the value of the first bit field is 0, and may be determined that N=4 when the value of the first bit field is 1.

It should be understood that in this implementation, the length of each bit field, the quantity of bits occupied by the extended SSB index and N, and the indication modes above are merely examples. For example, in an implementation of the present disclosure, partial bits of the extended SSB index may be jointly carried by the third bit field and the first bit field, and the implementations of the present disclosure are not limited to this.

Therefore, in an implementation of the present disclosure, by using a first bit field which is not meaningful any more(for subCarrierSpacingCommon) in the NR-U system to carry partial information of the extended SSB index and N, the terminal device obtains information of the extended SSB index and N according to the first bit field, so that the terminal device can determine the QCL relationship of SSBs according to the information of the extended SSB index and N.

In Implementation 2, at least partial information of the extended SSB index and N is carried by a second bit field.

As can be seen from the above description, in a communication system based on unlicensed spectrum, by specifying that PRB grids of SSB and non-SSB channels are aligned or have an offset of limited values, part or all of bits (corresponding to the second bit field) in the ssb-SubcarrierOffset may be saved to carry at least partial information of the extended SSB index and N.

It is assumed that M1 bits of the M bits of the ssb-SubcarrierOffset may be used for carrying at least partial information of the extended SSB index and N, that is, the second bit field has M1 bits. Optionally, M can be 4 or 5, and correspondingly, M1 can be 4 or 5, or any value from 1 to 3.

As an implementation, the DMRS sequence may be used for determining partial bits of the extended SSB index. Specifically, the DMRS sequence may be used for determining $K_1$ bits of the extended SSB index. For the specific determining modes, reference may be made to the relevant description of the previous implementations, which will not be repeated here.

The other $K-K_1$ bits in the K bits may be carried by the second bit field and/or the third bit field.

N may be carried by the second bit field and/or the third bit field.

In a specific example, K=5, $K_1$=3, and the $K_1$ bits are the low-order 3 bits of the K bits. As shown in FIG. 7, the DMRS sequence may be used for determining the low-order 3 bits (B0-B2) of the 5 bits of the extended SSB index, the third bit field may be used for carrying the high-order 2 bits (B3-B4) of the extended SSB index, and the second bit field is used for carrying N. Alternatively, the second bit field may be used for carrying the high-order 2 bits (B3-B4) of the extended SSB index, and the second bit field is further used for carrying N.

It should be understood that in this implementation, the length of each bit field, the quantity of bits occupied by the extended SSB index and N, and the indication mode above are merely examples. In an implementation of the present disclosure, N may alternatively be carried by the third bit field, or partial bits of the extended SSB index may be jointly carried by the third bit field and the second bit field, and the implementations of the present disclosure are not limited to this.

Therefore, in an implementation of the present disclosure, by specifying that PRB grids of SSB and non-SSB channels are aligned or have an offset of limited values, partial ssb-SubcarrierOffset information (corresponding to the second bit field) may be saved to carry partial information of the extended SSB index and N, so that the terminal device obtains information of the extended SSB index and N according to the second bit field, and therefore the terminal device can determine the QCL relationship of SSBs according to the information of the extended SSB index and N.

In Implementation 3, at least partial information of the extended SSB index and N is carried by a first bit field and a second bit field.

In Implementation 3, Implementation 1 and Implementation 2 are combined, and at least partial information of the extended SSB index and N may be carried jointly by a first bit field and a second bit field.

In an implementation, the DMRS sequence may be used for determining $K_1$ bits in the extended SSB index. For the specific determining modes, reference may be made to the relevant description of the previous implementations, which will not be repeated here.

The first bit field and the second bit field may be used for carrying at least one bit of the other $K+P-K_1$ bits in the K+P bit information of the extended SSB index and N.

Optionally, in some implementations, if the lengths of the first bit field and the second bit field are insufficient, the third bit field may be used to carry at least one bit of the $K+P-K_1$ bits.

In a specific example, K=5, $K_1$=3, P=2, and the $K_1$ bits are the low-order 3 bits of the K bits. As shown in FIG. 8, the DMRS sequence may be used for determining the low-order 3 bits (B0-B2) of the 5 bits of the extended SSB index, the third bit field may be used for carrying the high-order 2 bits (B3-B4) of the extended SSB index, and N is carried by the first bit field and the second bit field, or the high-order 2 bits can be carried by the second bit field, and N can be carried by the third bit field.

It should be understood that the quantity of bits occupied by the extended SSB index and N and the indication modes above are only examples, and in an implementation of the present disclosure, the above indication modes may alternatively be flexibly adjusted according to the quantity of bits occupied by the extended SSB index and N in combination with the lengths of the first bit field, the second bit field and the third bit field, and the implementations of the present disclosure are not limited to this.

Therefore, in an implementation of the present disclosure, by using the subCarrierSpacingCommon (corresponding to the first bit field) and partial or all bit fields of the ssb-SubcarrierOffset (corresponding to the second bit field) to carry partial information of the extended SSB index and N, the quantity of bits that can be used for carrying the information of the extended SSB index and N is further increased, so that the terminal device obtains the information of the extended SSB index and N according to the first bit field and the second bit field, and therefore, the terminal device can determine the QCL relationship of SSBs according to the information of the extended SSB index and N.

The wireless communication method according to an implementation of the present disclosure is described in detail above from a perspective of the terminal device in connection with FIGS. 2 to 8. Next, a wireless communication method according to another implementation of the present disclosure will be described in detail from a perspective of the network device in connection with FIG. 9. It should be understood that the description of the network device side corresponds to the description of the terminal device side, and the above description may be referred to for similar descriptions, which will not be repeated here to avoid repetition.

FIG. 9 is a schematic flow chart of a wireless communication method 300 according to another implementation of the present disclosure. The method 300 may be performed by the network device in the communication system shown in FIG. 1. As shown in FIG. 9, the method 300 includes S310.

In S310, the network device sends a first Synchronization Signal Block (SSB) to a terminal device in an unlicensed spectrum, wherein according to a first bit field and/or a second bit field in a Physical Broadcast Channel (PBCH) of the first SSB, an extended SSB index of the first SSB and/or a first parameter N for determining a Quasi-co-located (QCL) relationship are determined, wherein N is a positive integer, a bit position of the first bit field in the PBCH is the same as a bit position of a subcarrier spacing bit field in a PBCH on a licensed spectrum, and a bit position of the second bit field in the PBCH is partially or completely the same as a bit position of a subcarrier offset bit field in the PBCH in the licensed spectrum, and the extended SSB index of the first SSB and N are used for the terminal device to determine the QCL relationship of the first SSB and other SSBs, wherein N is a positive integer.

Optionally, in some implementations, the extended SSB index of the first SSB is carried by the first bit field and/or the second bit field in the PBCH of the first SSB, and a Demodulation Reference Signal (DMRS) sequence of the PBCH and/or a third bit field in the PBCH, wherein a bit position of the third bit field in the PBCH is partially or completely the same as a bit position of an idle bit field in a PBCH in the licensed spectrum.

Optionally, in some implementations, low-order $K_1$ bits in the extended SSB index are carried by the DMRS sequence of the PBCH, wherein the extended SSB index has K bits, $K_1$ and K are positive integers, and $K_1<K$;

at least one of the other $K-K_1$ bits in the extended SSB index is carried by the first bit field and/or the second bit field in the PBCH of the first SSB.

Optionally, in some implementations, N is carried by subcarrier spacing information and/or subcarrier offset information in the PBCH of the first SSB, and the DMRS sequence of the PBCH and/or an idle bit in the PBCH.

Optionally, in some implementations, N is carried by the DMRS sequence of the PBCH.

Optionally, in some implementations, the DMRS sequence of the PBCH and the first parameter N, wherein the second correspondence relationship is a correspondence relationship between multiple DMRS sequences and multiple values of the first parameter.

Optionally, in some implementations, the second correspondence relationship is a correspondence relationship between multiple DMRS sequences and multiple combinations of the first parameter and partial bits in the extended SSB index.

Optionally, in some implementations, the extended SSB index is used for indicating a position index of an actual transmission position of the first SSB in multiple candidate transmission positions.

Optionally, in some implementations, N is the quantity of SSBs actually sent by the network device.

Method implementations of the present disclosure are described in detail above with reference to FIGS. 2 to 9. Next, apparatus implementations of the present disclosure will be described in detail with reference to FIGS. 10 to 14. It should be understood that the apparatus implementations and the method implementations correspond to each other, and description of the method implementations may be referred to for similar description of the apparatus implementations.

FIG. 10 is a schematic block diagram of a terminal device 400 according to an implementation of the present disclosure. As shown in FIG. 10, the terminal device 400 includes a communication module 410 and a determining module 420.

The communication module 410 is configured to receive a first Synchronization Signal Block (SSB) in an unlicensed spectrum.

The determining module 420 is configured to determine an extended SSB index of the first SSB and/or a first parameter N for determining a Quasi-co-located (QCL) relationship according to a first bit field and/or a second bit field in a Physical Broadcast Channel (PBCH) of the first SSB, wherein N is a positive integer, a bit position of the first bit field in the PBCH is the same as a bit position of a subcarrier spacing bit field in a PBCH in a licensed spectrum, and a bit position of the second bit field in the PBCH is partially or completely the same as a bit position of a subcarrier offset bit field in the PBCH in the licensed spectrum; and determine the QCL relationship of the first SSB and other SSBs according to the extended SSB index of the first SSB and N.

Optionally, in some implementations, the determining module 420 is specifically configured to:
 determine an extended SSB index of the first SSB and/or N according to a first bit field and/or a second bit field in the PBCH of the first SSB, in combination with a Demodulation Reference Signal (DMRS) sequence of the PBCH and/or a third bit field in the PBCH,
 wherein a bit position of the third bit field in the PBCH is partially or completely the same as a bit position of an idle bit field in a PBCH in a licensed spectrum.

Optionally, in some implementations, the determining module 420 is specifically configured to:
 determine low-order $K_1$ bits in the extended SSB index according to the DMRS sequence of the PBCH in combination with a first correspondence relationship, wherein the first correspondence relationship is a correspondence relationship between multiple DMRS sequences and multiple extended SSB indexes, the extended SSB index has K bits, $K_1$ and K are positive integers, and $K_1 < K$; and
 determine at least one of the other $K-K_1$ bits in the extended SSB index according to the first bit field and/or the second bit field in the PBCH of the first SSB.

Optionally, in some implementations, the determining module 420 is further configured to determine N according to the DMRS sequence of the PBCH.

Optionally, in some implementations, the determining module 420 is specifically configured to determine N according to the DMRS sequence of the PBCH in combination with a second correspondence relationship, wherein the second correspondence relationship is a correspondence relationship between multiple DMRS sequences and multiple values of the first parameter.

Optionally, in some implementations, the second correspondence relationship is a correspondence relationship between multiple DMRS sequences and multiple combinations of the first parameter and partial bits in the extended SSB index.

Optionally, in some implementations, N is preconfigured or configured by a network device.

Optionally, in some implementations, the extended SSB index is used for indicating a position index of an actual transmission position of the first SSB in multiple candidate transmission positions.

Optionally, in some implementations, N is the quantity of SSBs actually sent by the network device.

Optionally, in some implementations, the determining module 420 is specifically configured to:
 determine the QCL relationship between the first SSB and other SSBs according to the result of the extended SSB index of the first SSB modulo N.

Optionally, in some implementations, the determining module 420 is further configured to:
 determine that the first SSB and a second SSB have the QCL relationship, if the result of the extended SSB index of the second SSB modulo N is equal to the result of the extended SSB index of the first SSB modulo N.

It should be understood that the terminal device 400 according to an implementation of the present disclosure may correspond to the terminal device in a method implementation of the present disclosure, and the above-mentioned and other operations and/or functions of various units in the terminal device 400 are respectively for implementing the corresponding flows of the terminal device in the method 200 as shown in FIG. 5, which will not be repeated here for brevity.

Figure 11:
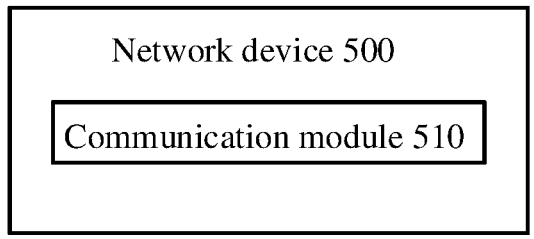
FIG. 11 is a schematic block diagram of a network device according to an implementation of the present disclosure.

FIG. 11 is a schematic block diagram of a network device according to an implementation of the present disclosure. The network device 500 in FIG. 11 includes a communication module 510.

The communication module 510 is configured to send a first Synchronization Signal Block (SSB) to a terminal device in an unlicensed spectrum, wherein according to a first bit field and/or a second bit field in a Physical Broadcast Channel (PBCH) of the first SSB, an extended SSB index of the first SSB and/or a first parameter N for determining a Quasi-co-located (QCL) relationship are determined, wherein N is a positive integer, a bit position of the first bit field in the PBCH is the same as a bit position of a subcarrier spacing bit field in a PBCH in a licensed spectrum, and a bit position of the second bit field in the PBCH is partially or completely the same as a bit position of a subcarrier offset bit field in the PBCH in the licensed spectrum, and the extended SSB index of the first SSB and N are used for the terminal device to determine the QCL relationship of the first SSB and other SSBs, wherein N is a positive integer.

Optionally, in some implementations, the extended SSB index of the first SSB is carried by the first bit field and/or the second bit field in the PBCH of the first SSB, and a Demodulation Reference Signal (DMRS) sequence of the PBCH and/or a third bit field in the PBCH, wherein a bit position of the third bit field in the PBCH is partially or completely the same as a bit position of an idle bit field in a PBCH in a licensed spectrum.

Optionally, in some implementations, low-order $K_1$ bits in the extended SSB index are carried by the DMRS sequence of the PBCH, wherein the extended SSB index has K bits, $K_1$ and K are positive integers, and $K_1<K$;

at least one of the other $K-K_1$ bits in the extended SSB index is carried by the first bit field and/or the second bit field in the PBCH of the first SSB.

Optionally, in some implementations, N is carried by subcarrier spacing information and/or subcarrier offset information in the PBCH of the first SSB, and the DMRS sequence of the PBCH and/or an idle bit in the PBCH.

Optionally, in some implementations, N is carried by the DMRS sequence of the PBCH.

Optionally, in some implementations, the DMRS sequence of the PBCH and the first parameter N, wherein the second correspondence relationship is a correspondence relationship between multiple DMRS sequences and multiple values of the first parameter.

Optionally, in some implementations, the second correspondence relationship is a correspondence relationship between multiple DMRS sequences and multiple combinations of the first parameter and partial bits in the extended SSB index.

Optionally, in some implementations, the extended SSB index is used for indicating a position index of an actual transmission position of the first SSB in multiple candidate transmission positions.

Optionally, in some implementations, N is the quantity of SSBs actually sent by the network device.

It should be understood that the network device 500 according to an implementation of the present disclosure may correspond to the network device in a method implementation of the present disclosure, and the above-mentioned and other operations and/or functions of various units in the network device 500 are respectively for implementing the corresponding flows of the network device in the method 300 as shown in FIG. 8, which will not be repeated here for brevity.

Figure 12:
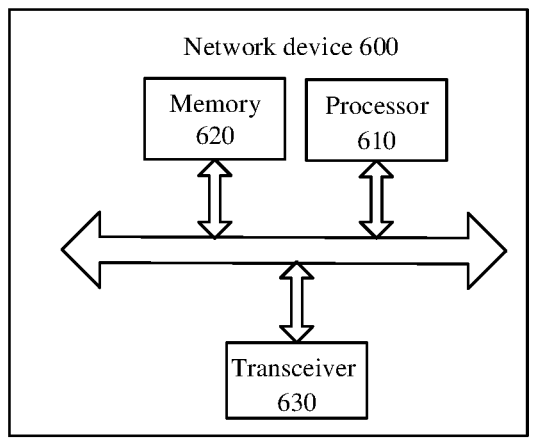
FIG. 12 is a schematic block diagram of a communication device according to another implementation of the present disclosure.

FIG. 12 is a schematic structural diagram of a communication device 600 according to an implementation of the present disclosure. The communication device 600 shown in FIG. 12 includes a processor 610. The processor 610 may call and run a computer program from a memory to implement the method in an implementation of the present disclosure.

Optionally, as shown in FIG. 12, the communication device 600 may further include a memory 620. The processor 610 may call and run a computer program from the memory 620 to implement the method in an implementation of the present disclosure.

The memory 620 may be a separate device independent of the processor 610 or may be integrated in the processor 610.

Optionally, as shown in FIG. 12, the communication device 600 may further include a transceiver 630, and the processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, and the quantity of antennas may be one or more.

Optionally, the communication device 600 may be specifically a network device of an implementation of the present disclosure, and the communication device 600 may implement the corresponding flows implemented by the network device in various methods of the implementations of the present disclosure, which will not be repeated here for brevity.

Optionally, the communication device 600 may be specifically a mobile terminal/terminal device of an implementation of the present disclosure, and the communication device 600 may implement the corresponding flows implemented by the mobile terminal/terminal device in various methods of the implementations of the present disclosure, which will not be repeated here for brevity.

Figure 13:
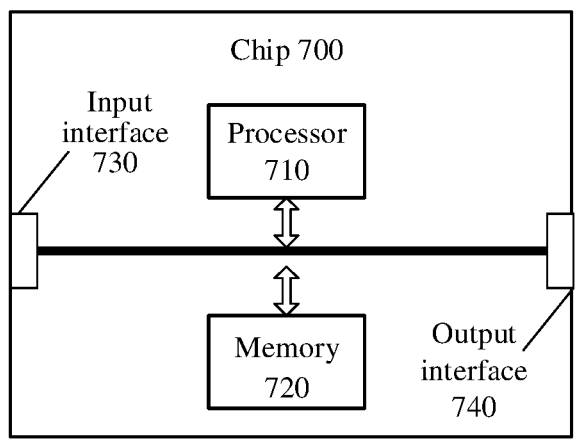
FIG. 13 is a schematic block diagram of a chip according to an implementation of the present disclosure.

FIG. 13 is a schematic diagram of a structure of a chip according to an implementation of the present disclosure. A chip 700 shown in FIG. 13 includes a processor 710. The processor 710 may call and run a computer program from a memory to implement the methods in the implementations of the present disclosure.

Optionally, as shown in FIG. 13, the chip 700 may further include a memory 720. The processor 710 may call and run a computer program from the memory 720 to implement the methods in the implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to a network device of an implementation of the present disclosure, and the chip may implement corresponding flows implemented by the network device in various methods of the implementations of the present disclosure, which will not be repeated here for brevity.

Optionally, the chip may be applied to a mobile terminal/terminal device of an implementation of the present disclosure, and the chip may implement corresponding flows implemented by the mobile terminal/terminal device in various methods of the implementations of the present disclosure, which will not be repeated here for brevity.

It should be understood that the chip mentioned in the implementations of the present disclosure may also be referred to as a system-level chip, a system chip, a chip system or a system-on-chip, etc.

Figure 14:
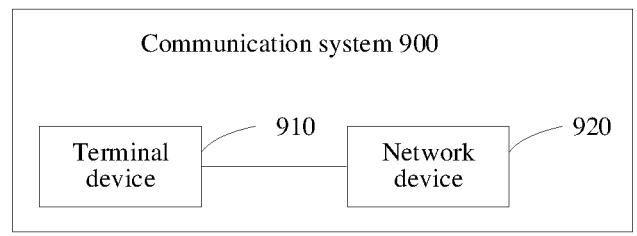
FIG. 14 is a schematic block diagram of a communication system according to an implementation of the present disclosure.

FIG. 14 is a schematic block diagram of a communication system 900 according to an implementation of the present disclosure. As shown in FIG. 14, the communication system 900 includes a terminal device 910 and a network device 920.

Herein, the terminal device 910 may be configured to implement corresponding functions implemented by the terminal device in the above-mentioned methods, and the network device 920 may be configured to implement corresponding functions implemented by the network device in the above-mentioned methods, which will not be repeated here for brevity.

It should be understood that the processor in the implementation of the present disclosure may be an integrated circuit chip having a signal processing capability. In an implementation process, the steps of the foregoing method implementations may be implemented by an integrated logic circuit of hardware in the processor or instructions in a form of software. The processor may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or execute methods, acts and logical block diagrams disclosed in the implementations of the present disclosure. The general purpose processor may be a microprocessor, or the processor may be any conventional processor or the like. The acts of the methods disclosed with reference to the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads the information in the memory and completes the acts of the above methods in combination with its hardware.

It may be understood that the memory in the implementations of the present disclosure may be a transitory memory or a non-transitory memory, or may include both a transitory memory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described here is intended to include, without being limited to, these and any other suitable types of memory.

It should be understood that the foregoing memory is an example for illustration, but not for limiting. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the implementations of the present disclosure are intended to include, without being limited to, these and any other suitable types of memories.

An implementation of the present disclosure further provides a computer readable storage medium for storing a computer program.

Optionally, the computer readable storage medium may be applied to a network device of an implementation of the present disclosure, and the computer program enables a computer to perform corresponding flows implemented by the network device in various methods of the implementations of the present disclosure, which will not be repeated here for brevity.

Optionally, the computer readable storage medium may be applied to a mobile terminal/terminal device of an implementation of the present disclosure, and the computer program enables a computer to perform corresponding flows implemented by the mobile terminal/terminal device in various methods of the implementations of the present disclosure, which will not be repeated here for brevity.

An implementation of the present disclosure also provides a computer program product including computer program instructions.

Optionally, the computer program product may be applied to a network device of an implementation of the present disclosure, and the computer program instructions enable a computer to perform corresponding flows implemented by the network device in various methods of the implementations of the present disclosure, which will not be repeated here for brevity.

Optionally, the computer program product may be applied to a mobile terminal/terminal device of an implementation of the present disclosure, and the computer program instructions enable a computer to perform corresponding flows implemented by the mobile terminal/terminal device in various methods of the implementations of the present disclosure, which will not be repeated here for brevity.

An implementation of the present disclosure also provides a computer program.

Optionally, the computer program may be applied to a network device of an implementation of the present disclosure. When running on a computer, the computer program enables the computer to execute corresponding processes implemented by the network device in various methods of the implementations of the present disclosure, which will not be repeated here for brevity.

Optionally, the computer program may be applied to a mobile terminal/terminal device of an implementation of the present disclosure. When running on a computer, the computer program enables the computer to execute corresponding processes implemented by the mobile terminal/terminal device in various methods of the implementations of the present disclosure, which will not be repeated here for brevity.

Those of ordinary skills in the art may recognize that the exemplary units and algorithm steps described in combination with the implementations disclosed herein may be implemented in electronic hardware, or a combination of computer software and electronic hardware. Whether these functions are implemented in hardware or software depends on the specific application and design constraints of the technical solutions. Professional technicians may use different methods to implement the described functions in respect to each particular application, but such implementation should not be considered to be beyond the scope of the present disclosure.

Those skilled in the art may clearly understand that for convenience and conciseness of description, as to the specific working processes of the systems, apparatuses and units described above, reference may be made to the corresponding processes in the method implementations, which will not be repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the objects of the solutions of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for enabling a computer device (which may be a personal computer, a server, a network device or the like) to perform all or part of the acts of the methods described in various implementations of the present disclosure. The storage medium includes various mediums capable of storing program codes, such as a USB flash disk, a removable hard disk, a Read-Only Memory (ROM), a Random Access Memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What I claim is:

1. A wireless communication method, comprising:
   receiving, by a terminal device, a first Synchronization Signal Block (SSB) in an unlicensed spectrum; wherein a Physical Broadcast Channel (PBCH) of the first SSB comprises a first bit field, a second bit field and at least one idle bit; and
   determining a first parameter N according to combination of a plurality of information, wherein the plurality of information comprises first information and second information, wherein the first information is carried on the first bit field, the second information is carried on the second bit field or the idle bit, wherein a bit position of the first bit field in the PBCH is the same as a bit position of a subcarrier spacing bit field in a PBCH on a licensed spectrum, and a bit position of the second bit field in the PBCH is partially or completely the same as a bit position of a subcarrier offset bit field in the PBCH in the licensed spectrum;
   wherein the first parameter N is a positive integer that is used for determining a Quasi-co-located (QCL) relationship, and
   determining the QCL relationship between the first SSB and other SSBs according to combination of an extended SSB index of the first SSB and N; wherein the QCL relationship between the first SSB and other SSBs is determined according to a result of the extended SSB index of the first SSB modulo N;
   wherein an extended SSB index is used for indicating a position index of an actual transmission position of the first SSB in a plurality of candidate transmission positions.

2. The method of claim 1, wherein the PBCH further comprises a third bit field, an extended SSB index of the first SSB is determined by a Demodulation Reference Signal (DMRS) sequence of the PBCH and the third bit field, wherein the third bit field corresponds to partial or all bits of an idle bit field in the PBCH in the licensed spectrum.

3. The method of claim 1, wherein determining, by the terminal device, the QCL relationship between the first SSB and other SSBs according to an extended SSB index of the first SSB and N comprises:
   determining that the first SSB and a second SSB have the QCL relationship, if a result of an extended SSB index of the second SSB modulo N is equal to a result of the extended SSB index of the first SSB modulo N.

4. The method of claim 1, wherein information carried by the PBCH comprises a plurality of bits in a Master Information Block (MIB) from a higher layer, wherein the plurality of bits comprise a subcarrier spacing bit, a subcarrier offset bit and the idle bit; wherein the first bit field corresponds to a subcarrier spacing bit field in a PBCH in a licensed spectrum, and the second bit field corresponds to all or part of bits of a subcarrier offset bit field in the PBCH in the licensed spectrum.

5. A wireless communication method, comprising:
   sending, by a network device, a first Synchronization Signal Block (SSB) to a terminal device in an unlicensed spectrum, wherein a Physical Broadcast Channel (PBCH) of the first SSB comprises a first bit field, a second bit field and at least one idle bit; wherein a first parameter N is determined according to combination of a plurality of information, wherein the plurality of information comprises first information and second information, wherein the first information is carried on the first bit field, the second information is carried on the second bit field or the idle bit, a bit position of the first bit field in the PBCH is the same as a bit position of a subcarrier spacing bit field in a PBCH on a licensed spectrum, and a bit position of the second bit field in the PBCH is partially or completely the same as a bit position of a subcarrier offset bit field in the PBCH in the licensed spectrum;
   wherein N is a positive integer, the first parameter N is used for determining a Quasi-co-located (QCL) relationship; wherein combination of an extended SSB index of the first SSB and N is used for the terminal device to determine the QCL relationship of the first SSB and other SSBs; wherein the QCL relationship between the first SSB and other SSBs is used for the terminal device to determine according to a result of the extended SSB index of the first SSB modulo N; wherein an extended SSB index is used for indicating a position index of an actual transmission position of the first SSB in a plurality of candidate transmission positions.

6. The method of claim 5, wherein the PBCH further comprises a third bit field, an extended SSB index of the first SSB is determined by a Demodulation Reference Signal (DMRS) sequence of the PBCH and the third bit field, wherein the third bit field corresponds to partial or all bits of an idle bit field in the PBCH in the licensed spectrum.

7. The method of claim 5, wherein information carried by the PBCH comprises a plurality of bits in a Master Information Block (MIB) from a higher layer, wherein the plurality of bits comprise a subcarrier spacing bit, a subcarrier offset bit and the idle bit; wherein the first bit field corresponds to a subcarrier spacing bit field in a PBCH in a licensed spectrum, and the second bit field corresponds to all or part of bits of a subcarrier offset bit field in the PBCH in the licensed spectrum.

8. A terminal device, comprising:
a transceiver configured to wirelessly receive a first Synchronization Signal Block (SSB) in an unlicensed spectrum; wherein a Physical Broadcast Channel (PBCH) of the first SSB comprises a first bit field, a second bit field and at least one idle bit; and
a processor coupled to the transceiver, the processor configured to
determine a first parameter N according to combination of a plurality of information, wherein the plurality of information comprises first information and second information, wherein the first information is carried on the first bit field, the second information is carried on the second bit field or the idle bit, wherein a bit position of the first bit field in the PBCH is the same as a bit position of a subcarrier spacing bit field in a PBCH on a licensed spectrum, and a bit position of the second bit field in the PBCH is partially or completely the same as a bit position of a subcarrier offset bit field in the PBCH in the licensed spectrum; wherein
the first parameter N is a positive integer used for determining a Quasi-co-located (QCL) relationship; and
determine the QCL relationship of the first SSB and other SSBs according to combination of an extended SSB index of the first SSB and N; wherein the QCL relationship between the first SSB and other SSBs is determined according to a result of the extended SSB index of the first SSB modulo N; wherein an extended SSB index is used for indicating a position index of an actual transmission position of the first SSB in a plurality of candidate transmission positions.

9. The terminal device of claim 8, wherein the PBCH further comprises a third bit field, an extended SSB index of the first SSB is determined by a Demodulation Reference Signal (DMRS) sequence of the PBCH and the third bit field,
wherein the third bit field corresponds to partial or all bits of an idle bit field in the PBCH in the licensed spectrum.

10. The terminal device of claim 8, wherein the processor is further configured to:
determine that the first SSB and a second SSB have the QCL relationship, if a result of an extended SSB index of the second SSB modulo N is equal to the result of the extended SSB index of the first SSB modulo N.

11. The terminal device of claim 8, wherein information carried by the PBCH comprises a plurality of bits in a Master Information Block (MIB) from a higher layer, wherein the plurality of bits comprise a subcarrier spacing bit, a subcarrier offset bit and the idle bit; wherein the first bit field corresponds to a subcarrier spacing bit field in a PBCH in a licensed spectrum, and the second bit field corresponds to all or part of bits of a subcarrier offset bit field in the PBCH in the licensed spectrum.

12. A network device, comprising:
a processor; and
a transceiver coupled to the processor and configured to send a first Synchronization Signal Block (SSB) to a terminal device in an unlicensed spectrum according to the processor, wherein a Physical Broadcast Channel (PBCH) of the first SSB comprises a first bit field, a second bit field and at least one idle bit, wherein a bit position of the first bit field in the PBCH is the same as a bit position of a subcarrier spacing bit field in a PBCH on a licensed spectrum, and a bit position of the second bit field in the PBCH is partially or completely the same as a bit position of a subcarrier offset bit field in the PBCH in the licensed spectrum; wherein
a first parameter N is determined according to combination of a plurality of information, wherein the plurality of information comprises first information and second information, wherein the first information is carried on the first bit field, the second information is carried on the second bit field or the idle bit, wherein N is a positive integer, the first parameter N is used for indicating a Quasi-co-located (QCL) relationship, and combination of an extended SSB index of the first SSB and N is used for the terminal device to determine the QCL relationship of the first SSB and other SSBs; wherein the QCL relationship between the first SSB and other SSBs is used for the terminal device to determine according to a result of the extended SSB index of the first SSB modulo N; wherein an extended SSB index is used for indicating a position index of an actual transmission position of the first SSB in a plurality of candidate transmission positions.

13. The network device of claim 12, wherein the PBCH further comprises a third bit field, an extended SSB index of the first SSB is determined by a Demodulation Reference Signal (DMRS) sequence of the PBCH and the third bit field, wherein the third bit field corresponds to partial or all bits of an idle bit field in the PBCH in the licensed spectrum.

14. The network device of claim 12, wherein information carried by the PBCH comprises a plurality of bits in a Master Information Block (MIB) from a higher layer, wherein the plurality of bits comprise a subcarrier spacing bit, a subcarrier offset bit and the idle bit; wherein the first bit field corresponds to a subcarrier spacing bit field in a PBCH in a licensed spectrum, and the second bit field corresponds to all or part of bits of a subcarrier offset bit field in the PBCH in the licensed spectrum.

* * * * *